(12) United States Patent
Wang et al.

(10) Patent No.: US 11,071,675 B2
(45) Date of Patent: Jul. 27, 2021

(54) LOWER LIMB EXOSKELETON SYSTEM HAVING JUMP-DOWN CUSHIONING FUNCTION AND METHOD OF USING THE SAME

(71) Applicant: NORTHEASTERN UNIVERSITY, Shenyang (CN)

(72) Inventors: Hong Wang, Shenyang (CN); Hao Tang, Shenyang (CN); Hailong Xi, Shenyang (CN); Chong Liu, Shenyang (CN); Kang Li, Shenyang (CN); Jingyi Qin, Shenyang (CN)

(73) Assignee: NORTHEASTERN UNIVERSITY, Shenyang (CN)

( * ) Notice: Subject to any disclaimer, the term of this patent is extended or adjusted under 35 U.S.C. 154(b) by 98 days.

(21) Appl. No.: 16/605,698

(22) PCT Filed: Jan. 22, 2019

(86) PCT No.: PCT/CN2019/072588
§ 371 (c)(1),
(2) Date: Oct. 16, 2019

(87) PCT Pub. No.: WO2020/147138
PCT Pub. Date: Jul. 23, 2020

(65) Prior Publication Data
US 2020/0281745 A1    Sep. 10, 2020

(30) Foreign Application Priority Data

Jan. 14, 2019    (CN) .......................... 201910032241.7

(51) Int. Cl.
*A61H 3/00* (2006.01)
(52) U.S. Cl.
CPC ..................................... *A61H 3/00* (2013.01)

(58) Field of Classification Search
CPC ............................... B25J 9/0006; A63B 25/08
See application file for complete search history.

(56) References Cited

U.S. PATENT DOCUMENTS

| | | | | |
|---|---|---|---|---|
| 2002/0094919 | A1* | 7/2002 | Rennex | A61H 3/008 482/124 |
| 2002/0177906 | A1* | 11/2002 | Phillips | F16F 1/48 623/27 |

(Continued)

FOREIGN PATENT DOCUMENTS

| | | |
|---|---|---|
| CN | 105438306 A | 3/2016 |
| CN | 105479438 A | 4/2016 |

(Continued)

*Primary Examiner* — Jennifer Dieterle
*Assistant Examiner* — Danielle A. Stark
(74) *Attorney, Agent, or Firm* — Muncy, Geissler, Olds & Lowe, P.C.

(57) ABSTRACT

A lower limb exoskeleton system includes a back frame, hip joint movement mechanisms, telescopic thigh bars, knee joint movement mechanisms, shank bars, foot jump-down cushioning mechanisms, a waist binding frame, upper leg binding frames and lower leg binding frames. Two protruding ends of the back frame are connected with a top end of each of the telescopic thigh bars respectively via the hip joint movement mechanisms, bottom ends of the telescopic thigh bars are connected with a top end of the corresponding shank bars respectively via the knee joint movement mechanisms, and bottom ends of the shank bars are connected with the foot jump-down cushioning mechanisms. The waist binding frame is arranged on an inner side of a horizontal part of the back frame, and the upper leg binding frames and the lower leg binding frames are arranged on the telescopic thigh bars and the shank bars respectively.

6 Claims, 4 Drawing Sheets

(56) References Cited

U.S. PATENT DOCUMENTS

| | | | | |
|---|---|---|---|---|
| 2006/0052731 A1* | 3/2006 | Shimada | ............... | A61H 3/00 |
| | | | | 602/5 |
| 2009/0143869 A1 | 6/2009 | Cheng et al. | | |
| 2011/0040216 A1* | 2/2011 | Herr | ............... | A61F 5/0102 |
| | | | | 601/34 |
| 2020/0206065 A1* | 7/2020 | Yang | ............... | A61H 1/0262 |

FOREIGN PATENT DOCUMENTS

| | | | | |
|---|---|---|---|---|
| CN | 105904439 A | | 8/2016 | |
| CN | 105965483 A | | 9/2016 | |
| CN | 106005079 A | | 10/2016 | |
| CN | 106726363 A | | 5/2017 | |
| CN | 107049713 A | | 8/2017 | |
| CN | 108272598 A | * | 7/2018 | |
| CN | 109070340 A | * | 12/2018 | ............. A61H 1/024 |
| DE | 102004016294 B3 | * | 8/2005 | ....... A63B 21/00069 |
| EP | 0229537 A1 | * | 7/1987 | ........... A61H 1/0237 |
| JP | 3185908 U | * | 9/2013 | |

* cited by examiner

LOWER LIMB EXOSKELETON SYSTEM HAVING JUMP-DOWN CUSHIONING FUNCTION AND METHOD OF USING THE SAME

BACKGROUND OF THE INVENTION

1. Field of the Invention

The present invention belongs to the technical field of mechatronic engineering and biomedical engineering, and more particularly, to provide a lower limb exoskeleton system having jump-down cushioning function and a method of using the same.

2. The Prior Arts

Lower limb exoskeleton is a wearable machine made of a metal frame, and can enhance the lower limb function of human bodies. In the military field, the lower limb exoskeleton can drive mechanical joints to perform actions according to physical acts of human, and help a wearer to run faster and be high in loading capacity. In the medical rehabilitation field, the lower limb exoskeleton can assist in recovering the leg walking ability of the elderly and the disabled people wearing the lower limb exoskeleton, and even help paralyzed people to stand and walk again.

At current, most of lower limb exoskeletons are used for assisting in the wearer to walk and run on flat ground and go upstairs. When the wearer jumps down, the lower limb exoskeletons are needed to have the cushioning function for resisting ground reaction force. However, most of current lower limb exoskeletons neither have such function, nor ensure the lower limb safety of the wearer when the wearer jumps down from a high place. For this reason, the application proposes a lower limb exoskeleton system having jump-down cushioning function, i.e. the lower limb exoskeleton system provides the cushioning function for resisting ground reaction force based on an instruction given by the wearer when the wearer jumps down, so that the lower limb exoskeleton system can protect the lower limbs from being damaged when the wearer jumps down. The lower limb exoskeleton system has foot jump-down cushioning mechanisms at the points of the lower limb exoskeleton system with ground, which meet the cushioning requirements of 1.5 m jump-down height.

SUMMARY OF THE INVENTION

A primary objective of the present invention is to provide a lower limb exoskeleton system having jump-down cushioning function and a method of using the same.

For achieving the foregoing objectives, the present invention provides a lower limb exoskeleton system having jump-down cushioning function. The lower limb exoskeleton system having jump-down cushioning function comprises a back frame, two hip joint movement mechanisms, two telescopic thigh bars, two knee joint movement mechanisms, two shank bars, two foot jump-down cushioning mechanisms, a waist binding frame, two upper leg binding frames and two lower leg binding frames.

Two protruding ends of the back frame are connected with top ends of the hip joint movement mechanisms respectively, bottom ends of the hip joint movement mechanisms are connected with top ends of the telescopic thigh bars respectively, bottom ends of the telescopic thigh bars are connected with top ends of the knee joint movement mechanisms respectively, bottom ends of the knee joint movement mechanisms are connected with top ends of the shank bars respectively, and bottom ends of the shank bars are connected with the foot jump-down cushioning mechanisms respectively.

The waist binding frame is arranged on an inner side of a horizontal part of the back frame, the upper leg binding frames are arranged on the telescopic thigh bars respectively, and the lower leg binding frames are arranged on the shank bars respectively.

Each of the hip joint movement mechanisms consists of an abduction and adduction moving piece, a flexion and extension moving piece and an upper thigh bar connecting frame. Top ends of the abduction and adduction moving pieces are connected with the protruding ends of the back frame through bolts respectively, and bottom ends of the abduction and adduction moving pieces are connected with top ends of the flexion and extension moving pieces via two first pins respectively.

Bottom ends of the flexion and extension moving pieces are connected with top ends of the upper thigh bar connecting frames via two second pins respectively.

Each of the first pins and each of the second pins are perpendicular to each other.

Each of the telescopic thigh bars consists of an upper thigh bar and a lower thigh bar, wherein three threaded through holes are formed on an upper end of each of the lower thigh bar in one row, and the upper ends of the lower thigh bars are connected with bottom ends of the upper thigh bars via the threaded through holes and bolts respectively.

Top ends of the upper thigh bars are threadedly connected with upper thigh bar connecting frames of the hip joint movement mechanisms respectively, and the upper leg binding frames are connected to outer side surfaces of the upper thigh bars through bolts respectively.

Two through holes are formed on an ear plate at a bottom end of each of the lower thigh bars in one row.

Each of the knee joint movement mechanisms consists of a first lower thigh bar connecting frame, a second lower thigh bar connecting frame, a knee joint rotating piece, a harmonic reducer and a motor.

The first lower thigh bar connecting frames are connected with bottom ends of lower thigh bars of the telescopic thigh bars through bolts respectively, the second lower thigh bar connecting frames are connected with bottom ends of lower thigh bars of the telescopic thigh bars through bolts respectively, and the first lower thigh bar connecting frames are connected with flexible gears of the harmonic reducers and the motors respectively.

The harmonic reducers are located on inner sides of the first lower thigh bar connecting frames respectively, the motors are located on outer sides of the first lower thigh bar connecting frames respectively, harmonic generators of the harmonic reducers are connected with output shafts of the motors respectively, and steel output gears of the harmonic reducers are connected with the knee joint rotating pieces respectively.

Bottom ends of the knee joint rotating pieces are connected with top ends of the shank bars through bolts respectively.

Fixed-angle notch bosses are arranged on connecting sides of the first and second lower thigh bar connecting frames, and the connecting sides of the first and second lower thigh bar connecting frames are connected with the knee joint rotating pieces.

Each of the foot jump-down cushioning mechanisms consists of an electromagnet, an electromagnet fixing frame, two traction ropes, two clamps, a rubber mat, a shell, a moving sleeve, a cushioning spring, two reset springs and a control module.

Top ends of the shells are connected with bottom ends of the shank bars through bolts respectively, the moving sleeves are arranged in inner sides of the shells respectively, the cushioning springs are arranged in the moving sleeves respectively, top ends of the cushioning springs are abutted to inner limiting plates in the shells respectively, the clamps are arranged on outer side surfaces of lower middle parts of the shells respectively, middle parts of the clamps are hinged with the shells respectively, two bosses are arranged on an outer side surface of an upper part of each of the shells, and the reset springs are arranged between side surfaces at top ends of the clamps and the bosses of the shell.

The top ends of the clamps are connected with bottom ends of the traction ropes respectively, and top ends of the traction ropes are connected with the electromagnets respectively.

The electromagnets are arranged on the electromagnet fixing frames through bolts respectively, and the electromagnet fixing frames are fixed to the shank bars through bolts respectively.

Bottom ends of the clamps are connected with bottom ends of the moving sleeves respectively, the bottom ends of the moving sleeves are connected with the rubber mats through bolts respectively, Bonding surfaces between the rubber mats and the moving sleeves are bound through rubber-metal adhesive glue, and grooves are formed on the rubber mats.

The control modules are connected with the electromagnets respectively.

Each of the control modules comprises an upper computer, a wireless communication module, a control panel and a relay, wherein the upper computers are connected with the control panels through the wireless communication modules respectively, the control panels are electrically connected with the relays respectively, and the relays are electrically connected with the electromagnets respectively.

For achieving the foregoing objectives, the present invention provides a method of using the lower limb exoskeleton system having jump-down cushioning function. The method of using the lower limb exoskeleton system having jump-down cushioning function comprises the following steps:

fixing the lower limb exoskeleton system to a wearer, wherein the fixing comprises attaching the back frame of the lower limb exoskeleton system to a waist of the wearer through binding tapes and the waist binding frame, attaching the telescopic thigh bars to thighs of the wearer through the upper leg binding frames and binding tapes, and attaching the shank bars to shanks of the wearer through the lower leg binding frames and binding tapes;

when the wearer walks on flat ground, motors in the knee joint movement mechanisms outputting torque to control the walking action, and harmonic reducers of the knee joint movement mechanisms converting rotation of outer shafts of the motors into flexion and extension movements of the knee joint movement mechanisms, so that the hip joint movement mechanisms are driven to passively follow the wearer to move;

when jump-down movement is needed, the upper computers sending instructions to the control panels via the wireless communication modules, output pins of the control panels controlling the relays to be connected, electrifying the electromagnets to be connected to drag the traction ropes and open the clamps, and the cushioning springs compressed into the shells pushing the moving sleeves to a limit position under an action of spring force;

in a landing process, the rubber mats being in contact with the ground and pressing the moving sleeves into the shells under an action of ground support forces, so that the cushioning springs are compressed into the shells again;

after complete landing, the upper computers sending instructions to control the control panels, and the output pins of the control panels controlling the relays to be disconnected so as to disconnect the electromagnets and loosen the traction ropes; and pushing the clamps to clamp the moving sleeves by an action of the reset springs, and therefore, compressing the cushioning springs in the shells without popping out to finish an entire jump-down cushioning action.

The lower limb exoskeleton system has the beneficial effects that:

First of all, the application proposes a lower limb exoskeleton system having jump-down cushioning function, i.e. the lower limb exoskeleton system provides the cushioning function for resisting ground reaction force based on an instruction given by the wearer while jumping down, so that the lower limb exoskeleton system can protect the lower limbs from being damaged when the wearer jumps down.

Secondly, the lower limb exoskeleton system has foot jump-down cushioning mechanisms at the points of contact with ground. Based on the energy conservation principle, the change in gravitational potential energy equals to the energy absorbed by the human body and the lower limb exoskeleton system through cushioning. Because energy absorbed by the human body through cushioning is limited, protection to the human body should be increased, i.e. energy to be absorbed by the human body in the cushioning process needs to be reduced. When cushioning springs of the foot jump-down cushioning mechanisms are compressed in the landing process, one part of gravitational potential energy is converted into internal energy of the cushioning springs, and the energy absorption ability of the lower limb exoskeleton system is improved, so that the energy absorbed by the human body is reduced, the safety of the human body in jump-down landing is guaranteed, and the cushioning need of 1.5 m jump-down height is satisfied.

DETAILED DESCRIPTION OF THE PREFERRED EMBODIMENT

The present invention is further described hereinafter in combination with accompanying drawings and embodiments.

As shown in FIGS. 1-7, a lower limb exoskeleton system having jump-down cushioning function comprises a back frame 1, two hip joint movement mechanisms 2, two telescopic thigh bars 7, two knee joint movement mechanisms 4, two shank bars 8, two foot jump-down cushioning mechanisms 5, a waist binding frame 6, two upper leg binding frames 3 and two lower leg binding frames 17. Two protruding ends of the back frame 1 are connected with top ends of the hip joint movement mechanisms 2 respectively, bottom ends of the hip joint movement mechanisms 2 are connected with top ends of the telescopic thigh bars 7 respectively, bottom ends of the telescopic thigh bars 7 are connected with top ends of the knee joint movement mechanisms 4 respectively, bottom ends of the knee joint movement mechanisms 4 are connected with top ends of the shank bars 8 respectively, and bottom ends of the shank bars 8 are threadedly connected with the foot jump-down cushioning mechanisms 5 respectively. The waist binding frame 6 is arranged on an inner side of a horizontal part of the back frame 1, the upper leg binding frames 3 are arranged on the telescopic thigh bars 7 respectively, and the lower leg binding frames 17 are arranged on the shank bars 8 respectively.

Figure 1:
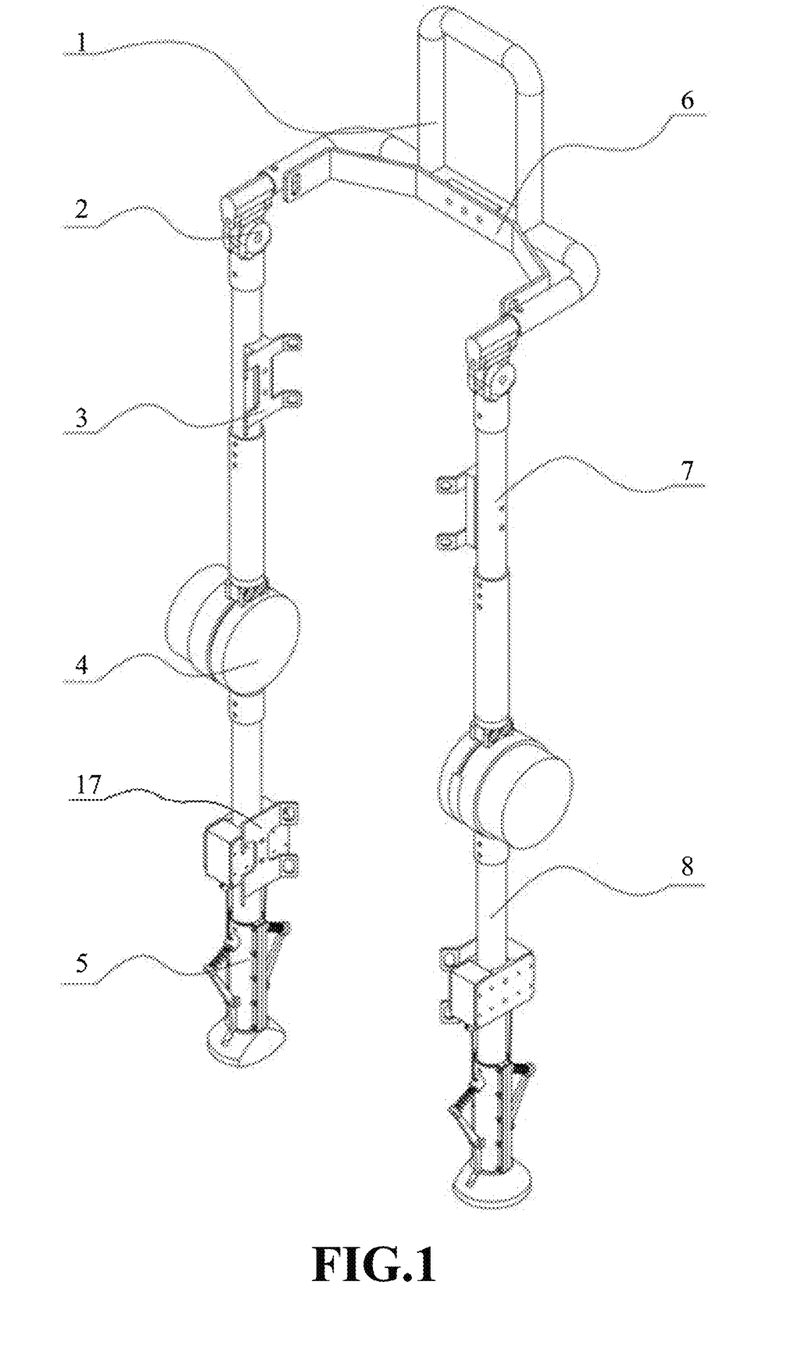
FIG. 1 is a front overall structural diagram of a lower limb exoskeleton system of the present invention.
Figure 2:
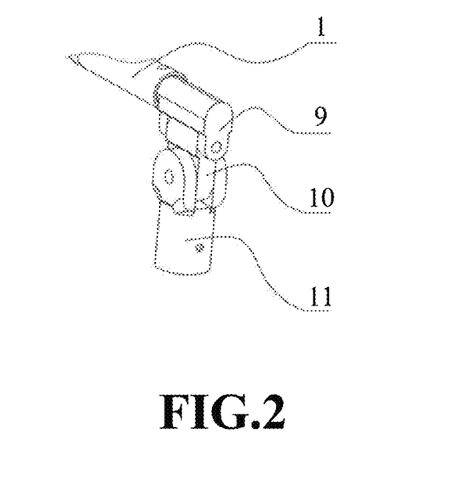
FIG. 2 is a front structural diagram of a hip joint movement mechanism of the lower limb exoskeleton system of the present invention.

Each of the hip joint movement mechanisms 2 consists of an abduction and adduction moving piece 9, a flexion and extension moving piece 10 and an upper thigh bar connecting frame 11. Top ends of the abduction and adduction moving pieces 9 are connected with the protruding ends of the back frame 1 through bolts respectively, and bottom ends of the abduction and adduction moving pieces 9 are connected with top ends of the flexion and extension moving pieces 10 via two first pins respectively to realize the abduction and adduction movements of the lower limb exoskeleton system. The bottom ends of the flexion and extension moving pieces 10 are connected with top ends of the upper thigh bar connecting frames 11 via two second pins respectively to form a rotating pair to realize flexion and extension movements of the hip joint movement mechanism 2. Each of the first pins and each of the second pins are perpendicular to each other. The hip joint movement mechanism 2 of the present invention has two degrees of freedom.

Figure 3:
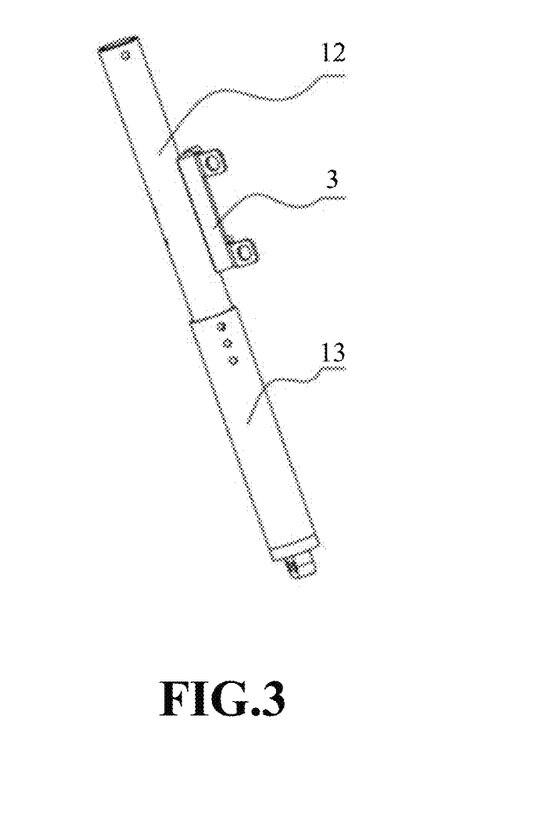
FIG. 3 is a front structural diagram of a telescopic thigh bar of the lower limb exoskeleton system of the present invention.

Each of the telescopic thigh bars 7 consists of an upper thigh bar 12 and a lower thigh bar 13. The upper thigh bar 12 and the lower thigh bar 13 are both made of aluminum tubes, three threaded through holes are formed on an upper end of each of the lower thigh bars 13 in one row, and the upper ends of the lower thigh bars 13 are connected with bottom ends of the upper thigh bars 12 via the threaded through holes and bolts respectively to realize the stepped length adjustment of the telescopic thigh bar 7. Top ends of the upper thigh bars 12 are threadedly connected with the upper thigh bar connecting frames 11 respectively, and the upper leg binding frames 3 are connected to middle parts of outer side surfaces of the upper thigh bars 12 through bolts respectively. Two through holes are formed on an ear plate at a bottom end of each of the lower thigh bars 13 in one row.

Figure 4:
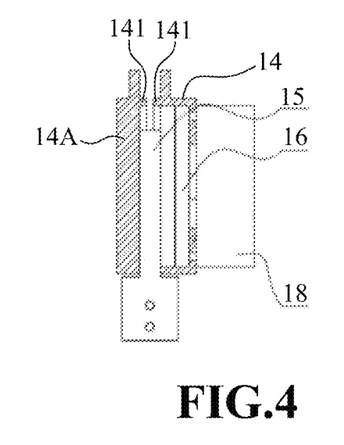
FIG. 4 is a structural diagram of a knee joint movement mechanism of the lower limb exoskeleton system of the present invention.

Each of the knee joint movement mechanisms 4 consists of a first lower thigh bar connecting frame 14 and a second lower thigh bar connecting frame 14A, a knee joint rotating piece 15, a harmonic reducer 16 and a motor 18. The first lower thigh bar connecting frames 14 are connected with the bottom ends of the lower thigh bar 13 through bolts respectively, the second lower thigh bar connecting frames 14A are connected with the bottom ends of lower thigh bars 13 through bolts respectively, and the first lower thigh bar connecting frames 14 are connected with flexible gears of the harmonic reducers 16 and the motors 18 respectively.

The harmonic reducers 16 are located on inner sides of the first lower thigh bar connecting frames 14 respectively, the motors 18 are located on outer sides of the first lower thigh bar connecting frames 14 respectively, harmonic generators of the harmonic reducers 16 are connected with output shafts of the motors 18 respectively, and steel output gears of the harmonic reducers 16 are connected with the knee joint rotating pieces 15 respectively. Bottom ends of the knee joint rotating pieces 15 are connected with top ends of the shank bars 8 through bolts respectively. Fixed-angle notch bosses 141 are arranged on connecting sides of the first and second lower thigh bar connecting frames 14, 14A, and the connecting sides of the first and second lower thigh bar connecting frames 14, 14A are connected with the knee joint rotating pieces 15. When the knee joint rotating pieces 15 rotate to front and rear limit positions, the knee joint rotating pieces 15 abut against the fixed-angle notch bosses 141 on the first and second lower thigh bar connecting frames 14, 14A to limit a moving range of the knee joint movement mechanisms 4. Two angle sensors are mounted on the motors 18 respectively to prevent the flexion and extension movements of the knee joint movement mechanisms 4 from out of normal range. The motors 18 output certain torque to drive the lower limb exoskeleton system to assist in the movement of human knee joints according to the movement principles and characteristics of human lower limbs in normal walking.

Figure 5:
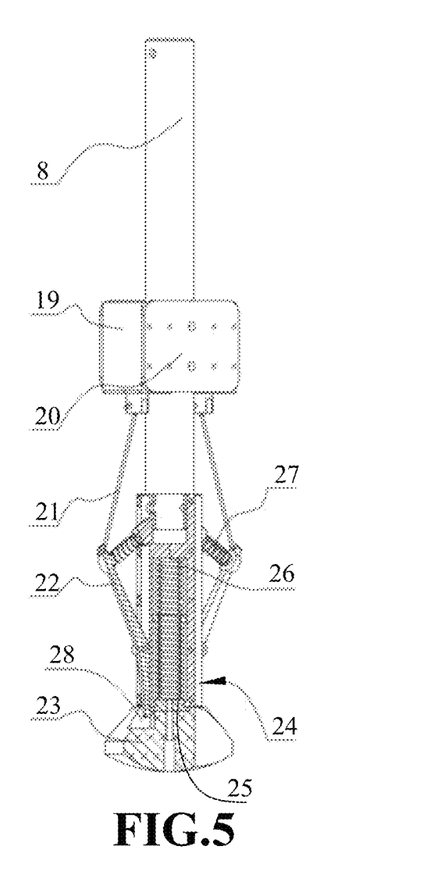
FIG. 5 is a structural diagram of a foot jump-down cushioning mechanism of the lower limb exoskeleton system of the present invention.

Each of the foot jump-down cushioning mechanisms 5 consists of an electromagnet 19, an electromagnet fixing frame 20, two traction ropes 21, two clamps 22, a rubber mat 23, a shell 24, a moving sleeve 25, a cushioning spring 26, two reset springs 27 and a control module 29. Top ends of the shells 24 are connected with bottom ends of the shank bars 8 through bolts respectively, the moving sleeves 25 are arranged in inner sides of the shells 24 respectively. Each of the shells 24 consists of two semicircular shells, protruding flanges are arranged on end surfaces of the semicircular shells, and the two semicircular shells are fixedly mounted through the protruding flanges and the bolts to form the each of shells 24. The cushioning springs 26 are arranged in the moving sleeves 25 respectively, an inner stop block is arranged at a bottom end of an inner wall of each of the shells 24, an outer stop block is arranged at a top end of an outer wall of each of the moving sleeves 25, the inner stop block of each of the shells 24 and the outer stop block of each of the moving sleeve 25 are in buckling to prevent each of the moving sleeves 25 from moving out of each of the shells 24, and top ends of the cushioning springs 26 are abutted against inner limiting plates in the shells 24 respectively. The clamps 22 are arranged on outer side surfaces of lower middle parts of the shells 24 respectively, middle parts of the clamps 22 are hinged with the shells 24 respectively, two bosses are arranged on an outer side surface of an upper part of each of the shells, and the reset springs 27 are arranged between side surfaces at top ends of the clamps 22 and the bosses of the shells 24 respectively. The reset springs 27 are biased to a compressed state, and the clamps 22 are pushed by the spring force of the reset springs 27 during jumping down so that bottom ends of the clamps 22 tightly press against lower end surfaces of the moving sleeves 25. The top ends of the clamps 22 are connected with bottom ends of the traction ropes 21 respectively, and top ends of the traction ropes 21 are connected with the electromagnets 19 respectively. The electromagnets 19 are push-pull frame DC electromagnets and are arranged on the electromagnet fixing frames 20 through bolts respectively, and the electromagnet fixing frames 20 are fixed on the shank bars 8 through bolts respectively. Bending parts at the bottom ends of the clamps 22 are connected with bottom ends of the moving sleeves 25 respectively to limit the position of the moving sleeves 25, and the bending parts at the bottom ends of the clamps 22 form a 90-degree angle with main body parts of the clamps 22. The bottom ends of the moving sleeves 25 are connected with the rubber mats 23 through bolts respectively, and bonding surfaces between the rubber mats 23 and the moving sleeves 25 are bound through rubber-metal adhesive glue. Grooves 28 are formed on the rubber mats 23 so that the clamps 22 have enough movement space in expansion. The control modules 28 are connected with the electromagnets 19 respectively.

Figure 6:
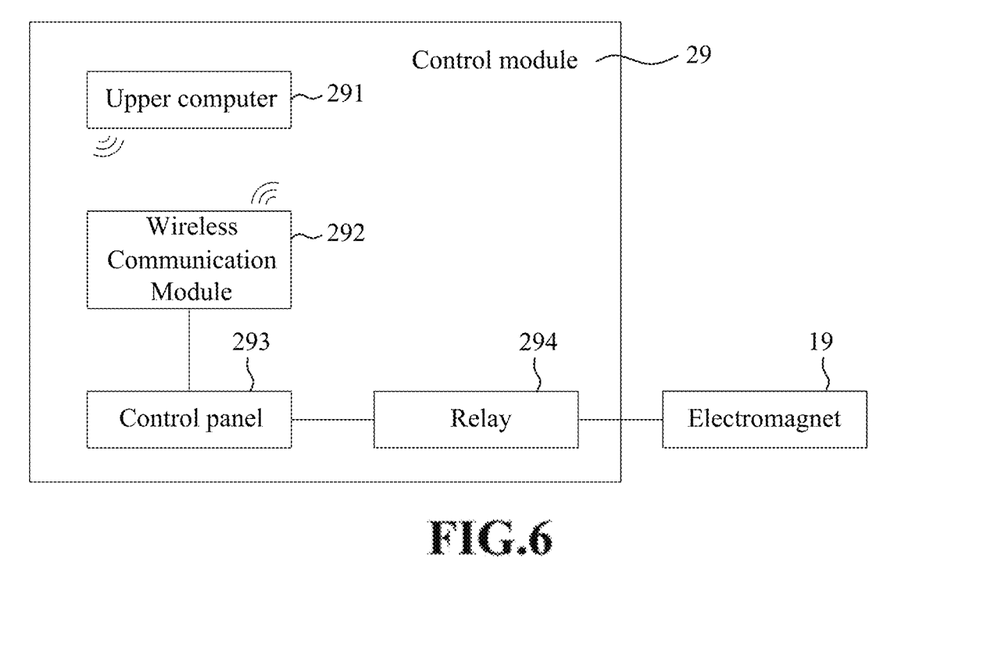
FIG. 6 is a diagram of a control module and an electromagnet of the present invention.

Each of the control modules 29 comprises an upper computer 291, a wireless communication module 292, a control panel 293 and a relay 294. The upper computers 291 are connected with the control panels 293 through the wireless communication modules 292 respectively, the control panels 293 are electrically connected with the relays 294 respectively, and the relays 294 are electrically connected with the electromagnets 19 respectively. The control panels 293 are mainly used for controlling the power-on and power-off of the push-pull frame DC electromagnets 19 respectively to further control the opening and closing of the clamps 22. Each of the upper computers 291 is an ordinary notebook computer, each of the wireless communication modules 292 is ZigBee wireless communication module, each of the control panels 293 is arduino mega2560 control panel, and each of the relay 294 is telesky24V relay.

Figure 7:
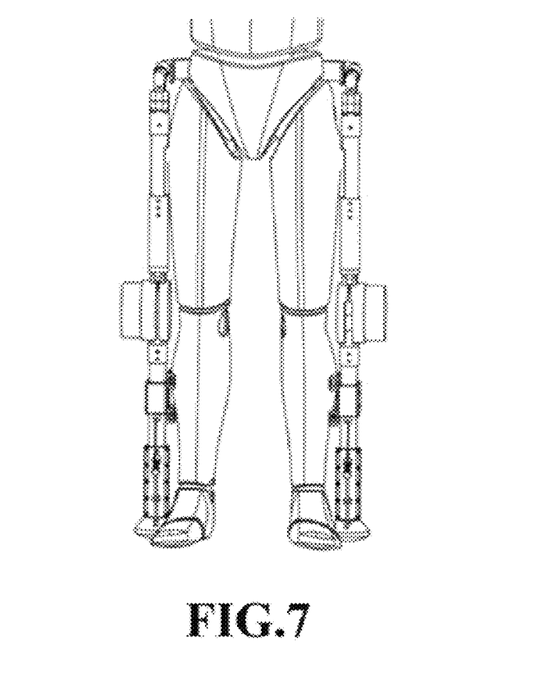
FIG. 7 is a diagram for virtual wearing of the lower limb exoskeleton system of the present invention.

A method of using the lower limb exoskeleton system having jump-down cushioning function comprises the following steps:

fixing the lower limb exoskeleton system to a wearer, wherein the fixing comprises attaching the back frame 1 of the lower limb exoskeleton system to a waist of the wearer through binding tapes and the waist binding frame 6, attaching the telescopic thigh bars 7 to thighs of the wearer through the upper leg binding frames 3 and binding tapes, and attaching the shank bars 8 to shanks of the wearer through the lower leg binding frames 17 and binding tapes;

when the wearer walks on flat ground, the motors 18 in the knee joint movement mechanisms 4 outputting torque to control the walking action, and the harmonic reducers 16 converting rotation of the outer shafts of the motors 18 into flexion and extension movements of the knee joint movement mechanisms 4, so that the hip joint movement mechanisms 2 are driven to passively follow the wearer to move;

when down jumping movement is needed, the upper computers 291 sending instructions to the control panels 293 via the wireless communication modules 292, output pins of the control panels 293 controlling the relays 294 to be connected, electrifying the push-pull frame DC electromagnets 19 to be connected to drag the traction ropes 21 and open the clamps 22, and the cushioning springs 26 compressed in the shells 24 pushing the moving sleeves 25 to a limit position under the action of spring force;

in a landing process, the rubber mats 23 being in contact with the ground and pressing the moving sleeves 25 into the shells 24 under an action of ground support forces, so that the cushioning springs 26 are compressed into the shells 24 again;

after complete landing, the upper computers 291 sending instructions to control the control panels 293, and the output pins of the control panels 293 controlling the relays 294 to be disconnected so as to disconnect the push-pull frame DC electromagnets 19 and loosen the traction ropes 21; and pushing the clamps 22 to clamp the moving sleeves 25 by an action of the reset springs 27, and therefore, compressing the cushioning springs 26 in the shells 24 without popping out to finish an entire jump-down cushioning action.

Embodiment 1

Ordinary people without special training are usually not liable to damage when jumping down from the height of 1.5 m. When the height is greater, people have a risk of injuries. This critical height is reduced when people are in load state. Therefore, it is assumed that a human wearing the lower limb exoskeleton system jumps down in free fall from 1.5 m height at an initial velocity of 0 m/s and the initial gravitational potential energy is $W_g$. Because the lower limb exoskeleton system and the human body system are high in mass, the impact of air resistance in falling is ignored. When the human jumps down to touch the ground, the final velocity is reduced to 0 m/s. During the process when the human and the lower limb exoskeleton system stop movement steadily, the energy absorbed by the cushioning of human skeletal muscles and joints is $W_1$, and the energy absorbed by the foot jump-down cushioning mechanisms of the lower limb exoskeleton system is $W_2$. According to the principle of energy conservation, it can be deduced that:

$$W_g = W_1 + W_2$$

which is equivalent to:

$$W_1 = W_g - W_2$$

Because the skeletal muscle and joint system of the human body has own utmost carrying ability, i.e. the skeletal muscle and joint system has limited cushioning ability, the energy absorbed by the skeletal muscle and joint system in the cushioning process is limited and set as $W_{1\ max}$. $W_1 = W_{1\ max}$ needs to be satisfied so as to ensure the safety of human body in jumping down, that is $W_1$ needs to be reduced. For each jump, other energy losses are not considered for the human body and the lower limb exoskeleton system during the entire jumping down process, and the initial gravitational potential energy $W_g$ is constant. Thus, $W_1$ can be reduced by increasing the cushioning ability of the lower limb exoskeleton system, i.e. $W_2$. In this embodiment, an elastic energy absorbing element in the foot jump-down cushioning mechanisms are springs. The stiffness factor of the springs is set as K, the compression displacement of the springs in one-time jumping down process is $\Delta x$, the energy absorbed by the springs in one-time jumping down process is $W_{spring} = \frac{1}{2}K\Delta x^2$, the impact of other parts of the lower limb exoskeleton system to energy is ignored, both feet have foot jump-down cushioning mechanisms, and therefore, it can be deduced that:

$$W_2 = 2W_{spring} = K\Delta x^2$$

the two formulas are combined to obtain that:

$$W_1 = W_g - K\Delta x^2$$

It can be known that the cushioning ability of the lower limb exoskeleton system can be adjusted by adjusting the stiffness of the springs in the foot jump-down cushioning mechanisms to meet different use requirements, so that the human body can be cushioned and protected when the wearer jumps down.

What is claimed is:

1. A lower limb exoskeleton system having jump-down cushioning function, comprising: a back frame, two hip joint movement mechanisms, two telescopic thigh bars, two knee joint movement mechanisms, two shank bars, two foot jump-down cushioning mechanisms, a waist binding frame, two upper leg binding frames and two lower leg binding frames;

wherein two protruding ends of the back frame are connected with top ends of the hip joint movement mechanisms respectively, bottom ends of the hip joint movement mechanisms are connected with top ends of the telescopic thigh bars respectively, bottom ends of the telescopic thigh bars are connected with top ends of the knee joint movement mechanisms respectively, bottom ends of the knee joint movement mechanisms are connected with top ends of the shank bars respectively, and bottom ends of the shank bars are connected with the foot jump-down cushioning mechanisms respectively;

wherein the waist binding frame is arranged on an inner side of a horizontal part of the back frame, the upper leg binding frames are arranged on the telescopic thigh bars respectively, and the lower leg binding frames are arranged on the shank bars respectively;

wherein each of the foot jump-down cushioning mechanisms consists of an electromagnet, an electromagnet fixing frame, two traction ropes, two clamps, a rubber mat, a shell, a moving sleeve, a cushioning spring, two reset springs and a control module;

wherein top ends of the shells are connected with the bottom ends of the shank bars through bolts respectively, the moving sleeves are arranged in inner sides of the shells respectively, the cushioning springs are arranged in the moving sleeves respectively, top ends of the cushioning springs are abutted to inner limiting plates in the shells respectively, the clamps are arranged on outer side surfaces of lower middle parts of the shells respectively, middle parts of the clamps are hinged with the shells respectively, two bosses are arranged on an outer side surface of an upper part of each of the shell, and the reset springs are arranged between side surfaces at top ends of the clamps and the bosses of the shells respectively;

wherein the top ends of the clamps are connected with bottom ends of the traction ropes respectively, and top ends of the traction ropes are connected with the electromagnets respectively;

wherein the electromagnets are arranged on the electromagnet fixing frames through bolts respectively, and the electromagnet fixing frames are fixed to the shank bars through bolts respectively;

wherein bottom ends of the clamps are connected with bottom ends of the moving sleeves respectively, the bottom ends of the moving sleeves are connected with the rubber mats through bolts respectively, bonding surfaces between the rubber mats and the moving sleeves are bound through rubber-metal adhesive glue, and grooves are formed on the rubber mat; and     wherein the control modules are connected with the electromagnets respectively.

2. The lower limb exoskeleton system according to claim 1, wherein each of the hip joint movement mechanisms consists of an abduction and adduction moving piece, a flexion and extension moving piece and an upper thigh bar connecting frame, wherein top ends of the abduction and adduction moving pieces are connected with the protruding ends of the back frame through bolts respectively, and bottom ends of the abduction and adduction moving pieces are connected with top ends of the flexion and extension moving pieces via two first pins respectively;

wherein bottom ends of the flexion and extension moving pieces are connected with top ends of the upper thigh bar connecting frames via two second pins respectively; and     wherein each of the first pins and each of the second pins are perpendicular to each other.

3. The lower limb exoskeleton system according to claim 1, wherein each of the telescopic thigh bars consists of an upper thigh bar and a lower thigh bar, wherein three threaded through holes are formed on an upper end of each of the lower thigh bars in one row, and the upper ends of the lower thigh bars are connected with bottom ends of the upper thigh bars via the threaded through holes and bolts respectively;

wherein top ends of the upper thigh bars are threadedly connected with upper thigh bar connecting frames of the hip joint movement mechanisms respectively, and the upper leg binding frames are connected to outer side surfaces of the upper thigh bars through bolts respectively; and     wherein two through holes are formed on an ear plate at a bottom end of each of the lower thigh bars in one row.

4. The lower limb exoskeleton system according to claim 1, wherein each of the knee joint movement mechanisms consists of a first lower thigh bar connecting frame, a second lower thigh bar connecting frame, a knee joint rotating piece, a harmonic reducer and a motor;

wherein the first lower thigh bar connecting frames are connected with bottom ends of lower thigh bars of the telescopic thigh bars through bolts respectively, the second lower thigh bar connecting frames are connected with bottom ends of lower thigh bars of the telescopic thigh bars through bolts respectively, and the first lower thigh bar connecting frames are connected with flexible gears of the harmonic reducers and the motors respectively;

wherein the harmonic reducers are located on inner sides of the first lower thigh bar connecting frames respectively, the motors are located on outer sides of the first lower thigh bar connecting frames respectively, harmonic generators of the harmonic reducers are connected with output shafts of the motors respectively, and steel output gears of the harmonic reducers are connected with the knee joint rotating pieces respectively;

wherein bottom ends of the knee joint rotating pieces are connected with top ends of the shank bars through bolts respectively; and     wherein fixed-angle notch bosses are arranged on connecting sides of the first and second lower thigh bar connecting frames, and the connecting sides of the first and second lower thigh bar connecting frames are connected with the knee joint rotating pieces.

5. The lower limb exoskeleton system according to claim 1, wherein each of the control modules comprises an upper computer, a wireless communication module, a control panel and a relay, wherein the upper computers are connected with the control panels through the wireless communication modules respectively, the control panels are electrically connected with the relays respectively, and the relays are electrically connected with the electromagnets respectively.

6. A method of using the lower limb exoskeleton system having jump-down cushioning function according to claim 5, comprising the following steps:

fixing the lower limb exoskeleton system to a wearer, wherein the fixing comprises attaching the back frame of the lower limb exoskeleton system to a waist of the wearer through binding tapes and the waist binding frame, attaching the telescopic thigh bars to thighs of the wearer through the upper leg binding frames and binding tapes, and attaching the shank bars to shanks of the wearer through the lower leg binding frames and binding tapes;

when the wearer walks, motors in the knee joint movement mechanisms outputting torque to control the walking action, and harmonic reducers of the knee joint movement mechanisms converting rotation of outer shafts of the motors into flexion and extension movements of the knee joint movement mechanisms, so that the hip joint movement mechanisms are driven to passively follow the wearer to move;

when jump-down movement is needed, the upper computers sending instructions to the control panels via the wireless communication modules, output pins of the control panels controlling the relays to be connected, electrifying the electromagnets to be connected to drag the traction ropes and open the clamps, and the cushioning springs compressed into the shells pushing the moving sleeves to a limit position under the action of spring force;

in a landing process, the rubber mats being in contact with the ground and pressing the moving sleeves into the shells under the action of ground support forces, so that the cushioning springs are compressed into the shells again;

after complete landing, the upper computers sending instructions to control the control panels, and the output pins of the control panels controlling the relays to be disconnected so as to disconnect the electromagnets and loosen the traction ropes; and pushing the clamps to clamp the moving sleeves by the action of the reset springs, and therefore, compressing the cushioning springs in the shells without popping out to finish an entire jump-down cushioning action.

* * * * *